United States Patent [19]

Pask

[11] Patent Number: 4,739,930

[45] Date of Patent: Apr. 26, 1988

[54] AGRICULTURAL FIELD SPRAYER

[75] Inventor: Glen S. Pask, Saskatoon, Canada

[73] Assignee: Flexi-Coil Limited, Saskatoon, Canada

[21] Appl. No.: 885,774

[22] Filed: Jul. 15, 1986

[51] Int. Cl.$^4$ .................................................. B05B 3/02
[52] U.S. Cl. ..................................... 239/161; 239/164; 239/167
[58] Field of Search ............... 239/160, 161, 167, 166, 239/164

[56] References Cited

U.S. PATENT DOCUMENTS

| 2,659,624 | 11/1953 | Harz | 239/164 |
| 2,712,198 | 7/1955 | Smith | 239/164 X |
| 2,965,304 | 12/1960 | Krause | 239/166 |
| 3,117,725 | 1/1964 | Palmer | 239/160 X |
| 3,285,516 | 11/1966 | Waldrum | 239/160 X |
| 3,401,890 | 9/1968 | Middlesworth | 239/167 X |
| 4,147,305 | 4/1979 | Hunt | 239/167 |
| 4,673,130 | 6/1987 | Simpson | 239/167 |

FOREIGN PATENT DOCUMENTS

| 2298264 | 8/1976 | France | 239/167 |
| 2408290 | 7/1979 | France | 239/164 |

Primary Examiner—Kenneth J. Dorner
Assistant Examiner—James R. Brittain
Attorney, Agent, or Firm—D. Ron Morrison

[57] ABSTRACT

An agricultural field sprayer is described, having a main boom center section rigidly mounted on a wheeled motive power source; wing sections of main boom hinged on either side of the center section are each supported on castoring wheels that can be locked in a non-castoring mode for transport; corresponding sections of spray boom and spray tubes with spray nozzles are mounted on the main boom sections to be rotated by rotation of the spray boom. Power from the motive source is used to rotate the boom. The hinged wing sections can move between an aligned working position along the axis of the center section and a transport position, trailing at right angles behind the center section for transport. In the working position, the power also is used to adjust the spray tube height, to accommodate variable spraying requirements. The wing sections of the boom are partly drawn, in working position, by rigid boom draws which are latched and unlatched from the motive power source by appropriate movement of the spray boom.

8 Claims, 4 Drawing Sheets

AGRICULTURAL FIELD SPRAYER

BACKGROUND OF THE INVENTION

This invention relates to field sprayers and more particularly to an automatically extendable and foldable sprayer that provides for both broad swath application of liquid chemical solutions in an extended or working position or condition and for narrow width in a transport position or condition, including means to vary the sprayers from one such position or condition to the other, from the operator's normal working position at motive power controls, simply by advancing or reversing the sprayer along its normal line of travel.

Essential elements of a field sprayer generally are:
1. Spray nozzles which eject liquid spray at spaced points along the length of a spray tube.
2. Spray tubes, which carry liquid to be sprayed, from a manifold or pump to all points along the length of a spray boom which extends across the width of an area to be sprayed.
3. A spray boom which supports the spray tubes and can be moved to adjust the height of the spray tubes and their spray nozzles relative to the ground, so that spray can be ejected at a height appropriate to the area or material being sprayed.
4. A main boom or support boom which carries the weight of the foregoing elements and supports it on wheels which are impelled across the ground by a suitable motive power source, e.g. tractor or truck, with the boom in either working position or in transport position. Because working width of the sprayer may be up to 30 meters or more, provision must be made for transportation of the boom in the direction of its longitudinal axis.

The prior art provides for height of spray variation by rotation of the spray boom about its longitudinal axis. Spray nozzles offset from this axis are raised or lowered accordingly. To obtain maximum stability of the associated main boom during transportation, the wheels must be fixed (non-castoring) wheels, but to prevent "scrubbing" or dragging of wheels when turning in the extended working position, it is necessary to have castoring wheels.

Such prior field sprayers were not automatically or readily foldable to achieve the narrow transport width necessary to transport the device through gates or along roadways and simultaneously retain the necessary rigidity in the boom structure. The operator was required to stop the tractor, dismount and remove a fastener in order to fold the implement into the transport position. Furthermore, the height of the working parts of the implement generally was not adjustable from the tractor while underway although some are now hydraulically adjustable.

My prior invention provided a field sprayer with a multiple section boom that could be extended to cover a wide swath in working position and could be folded to achieve narrow width in a transport position, the extension and folding operations being entirely operable from the operator's control position at the motive power controls of the equipment. Furthermore, the invention provided for powered adjustment of the spray height while in use without loss of overall rigidity or uniformity but required sets of both castoring field wheels and non-castoring transportation wheels to support the folding sections of the main boom. Powered rotation of the main boom transferred the weight of the folding sections of the main boom from the field wheels and engaged a separate set of transport wheels with the ground surface, cleared the sprayer nozzles and associated parts from interference on folding, and released the boom draws or boom pull braces for folding of the main and spray booms.

It has now been found that it is not necessary to rotate a main boom supporting a spray boom in order to obtain rotation of the spray boom; a spray boom can be supported on a main boom and rotated on its spray boom axis by powered means without rotating the supporting main boom, thereby obviating the need for an alternate set of supporting wheels for main boom folding sections when they are to be folded from a working position to a transport position. Powered means on a motive power source is used to rotate linked spray boom sections between a transport position, in which the spray boom holds spray tube sections parallel to and substantially vertically above the corresponding spray boom sections, and a working position, in which the spray boom holds the spray tube sections at an adjustable elevation substantially beside the spray boom. The main boom sections are linked by universal hinges that permit folding of the main boom in a horizontal plane between working and transport positions, and also permit flexing of the wing sections thereof in a vertical direction as the wing section supporting wheels rise and fall in passing over uneven ground. Similarly, the spray boom sections are linked by universal joints that enable rotation of the sections by powered means and at the same time permit both (a) flexing of the spray boom wing sections in a vertical direction as the respective supporting wheels rise and fall and (b) folding of the spray boom wing sections as their respective main boom sections fold in a horizontal plane between working and transport positions.

SUMMARY OF THE INVENTION

The invention thus comprises a field sprayer, extendable for broad swath application of liquid in working position and foldable for narrow width transport in a transport position comprising:
(a) a wheeled motive power source for drawing the sprayer over the ground,
(b) a main boom having (i) a center section, longitudinally aligned transverse to the line of travel of the sprayer and rigidly attached behind said power source and (ii) at least one wing section at each end of the center section, each wing section being offset from direct alignment with the center section and sections adjacent the center section being hingedly attached thereto by a respective universal hinge having a vertical axis and a horizontal axis, theoretical extensions of said axes intersecting at a point hereinafter designated, said wing sections being adapted for additional wheel support and foldable between a working position, aligned parallel with but offset from the center section, and a transport position at right angles to the center section;
(c) a spray boom having a center section and aligned wing sections corresponding to each of said main boom sections respectively and rotatably secured thereto in close parallel relation, said spray boom sections being rotatable about the axis of said alignment and flexibly linked by universal joints, the intersection of the axes of rotation of each said joint being the point of intersection of the aforesaid extensions of the respective main boom universal hinge axes, (d) sections of spray tube, each one rotatably attached to a corresponding spray boom section in spaced parallel relation to be rotated by rotation of the spray boom about the rotation axis of the spray boom, said spray tube sections being linked by flexible connections to a supply, on said motive power source, of liquid to be sprayed, (e) a plurality of spray nozzles at spaced points along the length of the spray tubes to eject liquid spray, (f) wheel means supporting each of said wing sections of said main boom substantially parallel to the ground, each said wheel means being adapted to engage the ground and support its respective wing section by a castor mounting in a castoring mode when the main boom wing sections are hinged in said working position and at least one of said castor mountings on each side of the center section being arranged to lock into a non-castoring mode when the main boom wing sections are folded into the transport position, (g) power means on said motive power source to rotate the spray boom center section and its spray tube section between a working position, in which the spray tube is held at an adjustable elevation substantially beside the spray boom, and a transport position, in which the spray tube is held substantially vertically above the spray boom, said center section simultaneously rotating the spray boom wing sections between their working position and transport position, (h) means responsive to the movement of the spray boom between its transport and working positions to lock and release the wheel means into non-castoring and castoring modes respectively, (i) a rigid boom draw means for each main boom wing section adjacent the center section, each said draw means being pivotally connected at the back end thereof to the respective wing section and having a front end adapted to move between a transport position, in which said front end is carried by the motive power source with no load thereon, and a working position in which the front end is releasably latched into a latched position on the motive power source to draw a load, and (j) connecting means, responsive to movement of said spray boom center section from its working position to its transport position, to release the front ends of the rigid boom draws from their latched position.

DESCRIPTION OF THE PREFERRED EMBODIMENT

Figure 1:
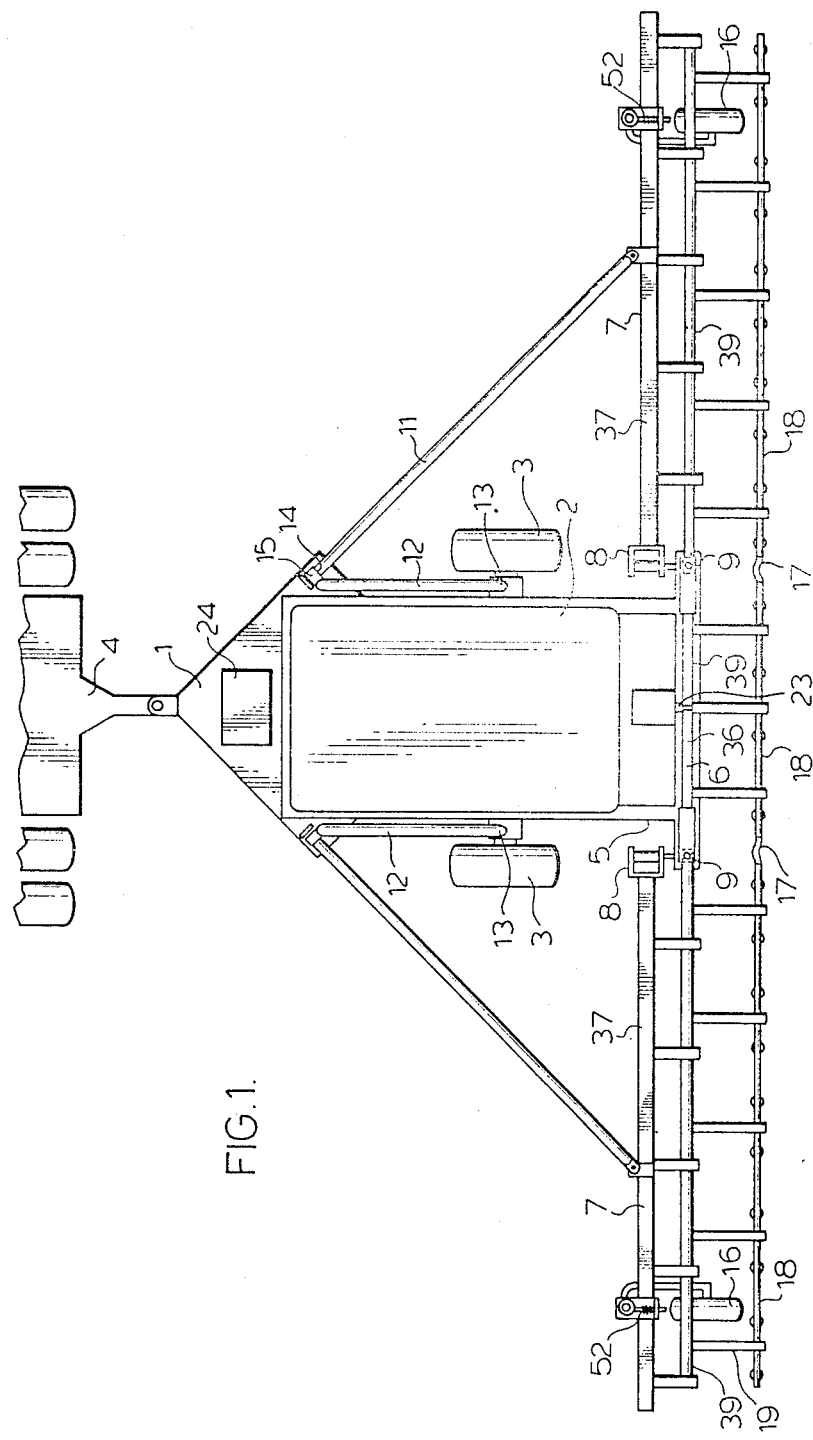
FIG. 1 is a general outline of a plan view of the field sprayer of the present invention in extended or working position.

Referring to FIG. 1, the numeral 1 refers to the wheeled tank conveyance or cart of the field sprayer shown as attached to a prime mover or tractor 4. The cart could optionally be self propelled, i.e. a truck, obviating need for a tractor 4.

Cart 1 is supported by a pair or two pairs of wheels 3 and carries a chemical tank 2 which acts as the source of fluid chemicals for the sprayer. Cart 1 also carries a pump 24 and suitable tubing and valves (not shown) to deliver the fluid chemicals under pressure to spray nozzles in a conventional manner. The frame of cart 1 may be of any suitable configuration.

Figure 2:
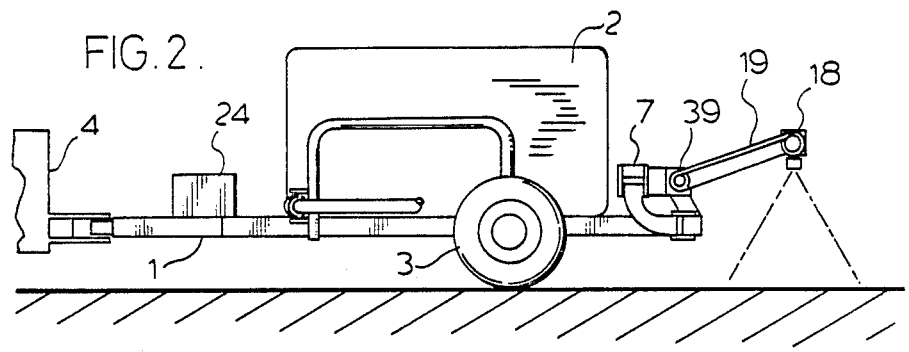
FIG. 2 is a general outline of a side elevation of the field sprayer shown in FIG. 1.

A three section boom structure comprising a center section 36 and two wing sections 37, each containing a main boom section 6 or 7, a spray boom section 39, and a spray tube section 18, is rigidly attached through section 6 to cart 1 by brackets 5. Main boom wing sections 7 are hingedly attached by universal or dual hinges 8 to opposite ends of center section 6 for rotation about horizontal axes 8A which are parallel to the direction of travel of the field sprayer when the boom structure is in the extended working position shown in FIGS. 1 and 2, and transverse to the direction of travel when the boom structure is in the transport position shown in FIG. 3 and 4. Spray tube 18 includes flexible portions 17, adjacent hinges 8, and spray nozzles (not shown). Pivoting of the wing sections about axes 8A in hinges 8, generally longitudinal to the cart when the wing sections are in the working position, provides flexibility to the boom structure so as to more evenly cover uneven ground. Additional pivoting of the wing sections about vertical axes 8B in hinges 8 (FIG. 4) permits folding of the wing sections from the working position shown in FIGS. 1 and 2 to the transport position shown in FIG. 3. The latter position of the hinge 8 is shown in FIG. 4 also. It will be noted from FIG. 4 that theortical extensions or projections of the axes 8A and 8B meet at a point which is the intersection of the axes of rotation of a universal joint 9 (FIG. 1) linking the center section of spray boom 39 to a wing section thereof. The spray boom sections and universal joint therebetween are omitted from FIG. 4 for clarity.

Returning to FIG. 1, the three sections of spray boom 39 are linked in alignment by universal joints 9. These universal joints enable transmission of any powered rotation of the center section of the spray boom to the wing sections thereof, and at the same time permit the wing sections to move in a vertical plane as the wheels 16 pass over uneven ground and also permit the wing sections to fold in a horizontal plane from the extended working position of FIG. 1 to the transport position of FIG. 3.

Figure 4:
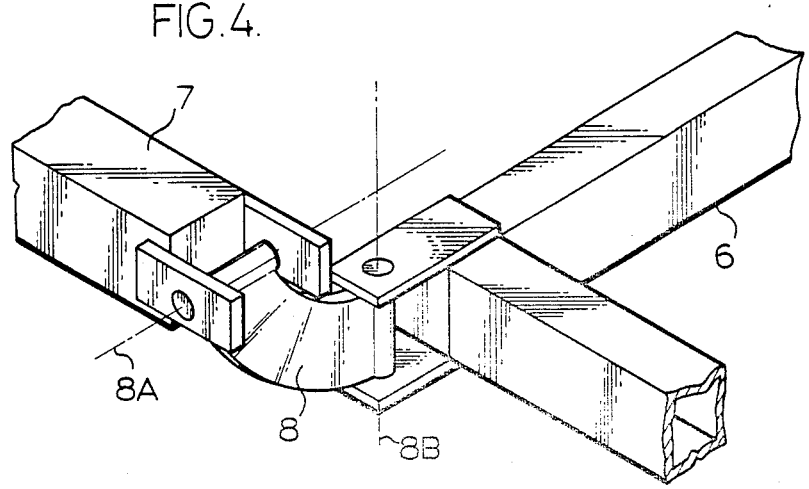
FIG. 4 is an isometric projection of a suitable universal hinge used to join two sections of the main boom element of the field sprayer, when it is in transport position of FIG. 3.
Figure 5:
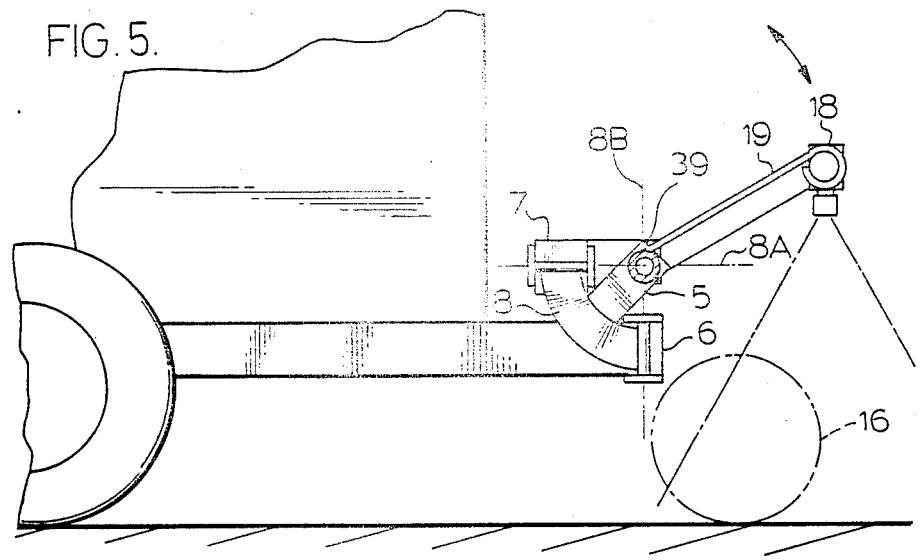
FIG. 5 is a side elevation showing some details of the relative position of a universal hinge and its connected main boom sections in the working position of FIGS. 1 and 2.

FIG. 5, in which extraneous parts are omitted, illustrates, in more detail, the relative working positions of the main boom sections 6 and 7, universal hinge 8, spray boom 39 (which is longitudinally rotatable and supported on and by main boom sections 6 and 7) and spray tube 18 which is supported by struts 19 on spray boom 39, and rotates therewith. The axis of rotation of spray boom 39 is on the intersection of projections of axes 8A and 8B of universal hinge 8. Additionally, this intersection is at the intersection of the axes of rotation of the universal joint 9 linking the center section of spray boom 39 to the corresponding adjacent wing section thereof. With this arrangement, the sections of spray boom 39 remain in their respective parallel positions relative to their respective supporting main boom sections when the latter move from the working position of FIGS. 1 and 2 to the transport position of FIG. 3. To preclude interference between spray tube sections 18 on the center and wing sections when the latter are to be folded into transport position, it is expedient to rotate spray boom 39 to bring spray tubes 18 to transport position vertically above spray boom 39; in this position, when the wing sections fold around axes 8B of hinges 8, illustrated in FIG. 4, the spray tube sections and their supporting struts are clear of interference with one another, being in substantially vertical planes with their supporting spray boom sections folding on the vertical axes 8B.

Figure 6:
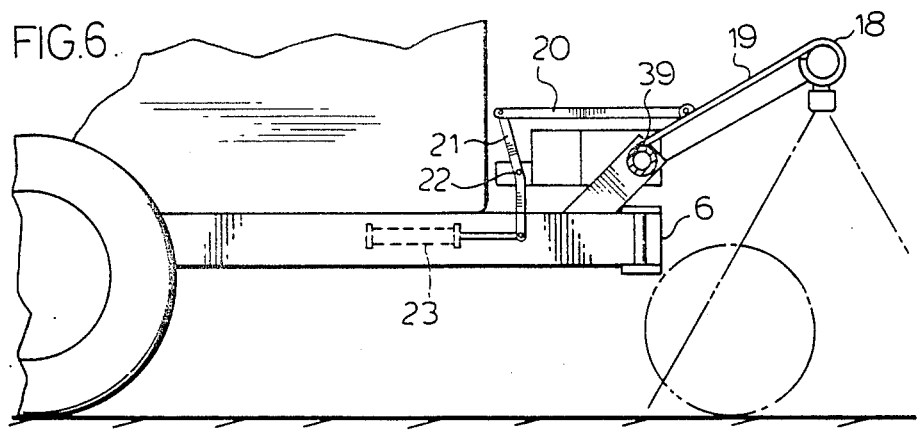
FIG. 6 is a side elevation showing some details of means to rotate the spray boom for adjustment of the elevation of the spray tubes, for both spraying height adjustment and for their movement to transport position.

A convenient means for rotation of the center section of spray boom 39 is described with reference to FIGS. 1 and 6, the latter omitting extraneous details. Spray boom 39, supported on main boom center section 6, is attached by a pivot link 20 to a pivoted bent lever 21 which pivots on a pivot pin 22 mounted in the back of main boom section 6. The distal end of lever 21 is connected to a reciprocating power source, conveniently an hydraulic cylinder 23. Extension of the piston of the hydraulic cylinder from the position as shown in FIG. 6 pivots bent lever 21 which then pulls on pivot link 20 to rotate spray boom 39 and raises struts 19 and spray tube 18. Contraction of the piston into hydraulic cylinder 23 correspondingly lowers spray tube 18. As the sections of spray boom 39 are in alignment and linked by universal joints 9, rotation of the center section, by this arrangement, rotates the wing sections as well, so that all sections of spray tube 18 are raised or lowered simultaneously. As previously noted, in transport position the spray tubes 18 are rotated to place them substantially vertically above the spray boom 39, while in working position they are rotated to an elevation substantially alongside the spray boom, depending on the height above ground it is desired to discharge liquid from the spray nozzles. Usually the convenient heights for the spray nozzles have the spray tubes located at an elevation from about 15 degrees above the spray boom to one about 45 degrees below the spray boom.

Extension of a hydraulic cylinder to rotate the spray boom from working position to transport position is also a convenient means to tighten a cable and release latches securing other parts of the sprayer in working position, now to be described.

Referring again to FIG. 1, each main boom wing section 7 is releasably secured to the cart 1 by means of a boom draw 11 and a releasable latch 15 which retain wing sections 37 perpendicular to the direction of travel in the working or extended position without significant motion in the horizontal plane such as is caused by uneven ground or downward grades.

Rigid fold arm 12 is attached to cart 1 for pivotal movement about a substantially vertical axis at hinge 13 and pivotally connected to boom draw 11 at joint 14 which is preferrably, for example, a sliding collar pivot. The pivot axis at hinge 13 provides that boom draw 11 is guided by fold arm 12 into latch 15 and maintained in working position therein, out of contact with the ground, while clearing cart wheel 3.

Wing sections 37 are each provided with one or more wheels 16 which support the wing sections 37 out of contact with the ground in both the working and transport positions. Wheels 16 are fitted with castor mountings, allowing castor action during turns in working position or condition; however at least one wheel in each wing must be fixed, i.e. non-castoring, in transport position. This is essential to permit safe transport in two way traffic. Therefore provision must be made to lock some wheels in a non-castoring mode for transport. This is achieved by means described later herein.

Figure 3:
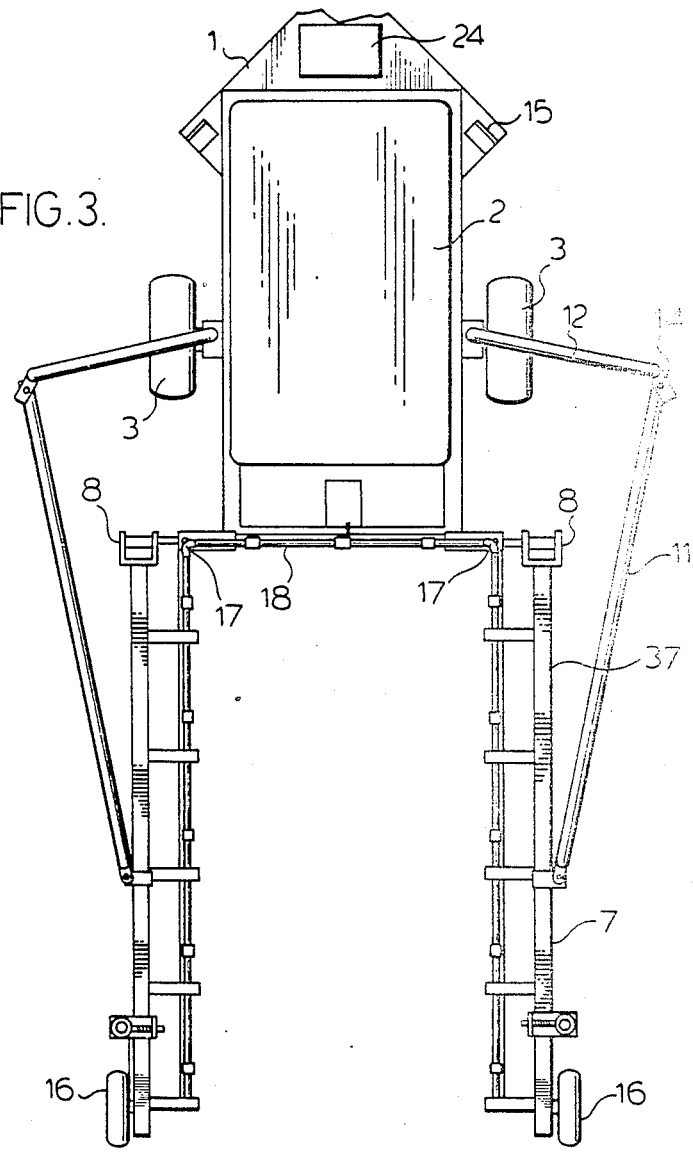
FIG. 3 is a general outline of a plan view of the field sprayer in transport position.

Rotation of the spray boom and spray tubes about the longitudinal axis of spray boom 39 to the transport position, as previously described, also pulls a release cable (not shown) to release latches 15, thus releasing boom draw 11 and permitting fold arms 12 and wing sections 37 to fold rearwardly, as the tractor 4 is moved ahead, into the transport configuration shown in FIG. 3, and thereafter transportation can proceed at transport speeds.

As shown in FIG. 1 and FIG. 3, boom draw 11 is secured at the back end to wing section 37, preferably by a free pivotal connection, and at its front end is secured to fold arm 12, preferably by a pivotal collar so as to be rotationally free about its own axis and slidably retained within the collar. This end of the boom draw is preferably disc-shaped and adapted to form the male portion of releasable latch 15. Releasable latch 15 also comprises a retractable female latch portion pivotably attached to be retractable below the disk shaped end of the boom draw. Retraction of the female latch portion releases the disc shaped end and thus releases boom draw 11 for rotation of fold arm 12 about axis 13.

Although boom draw 11 is preferably slidably received in joint 14 by a collar, it may also simply be fixed to fold arm 12 for pivotal movement.

The female latch portion retaining the end of the boom draw is connected to the spray boom center section by a cable (not shown). Rotation from working position to transport position of the spray boom center section about its longitudinal axis tightens the cable and retracts the female latch portion below the male latch portion. Wing sections 37 then are free to move into the transport position (FIG. 3) as forward movement of cart 1 and resistance of wheels 16 cause boom draw 1 to pull away from the latching position.

For further flexibility or increased width, wing sections 37 may be provided with additional sections, supporting castor wheels, and hinges for rotation about axes parallel to the direction of travel in the working position.

To convert the implement from transport position to working position, the operator reverses tractor 4. Wheels 16 carrying wing sections 37 swing outwardly and, as tractor 4 backs up further, wing sections 37 assume an extended intermediate position. As wing sections 37 swing outward, rotatable fold arms 12 carry boom draws 11 to engage their respective latches 15. When both boom draws are in an engaging position in latches 15, the operator rotates the spray boom center section from transport to working position, allowing the cable to release the female latch portion into latching position over the boom draw, thus securing boom draws 11 and wing sections 37 in working position. Rotation of the spray boom from transport to working position also operates a cam which retracts a detent that locks the wing supporting wheels in non-castoring mode while in the transport position, as explained more fully later.

Alternatively to fold arms 12, the forward end of boom draw 11 can slide in a track longitudinally mounted on cart 1, enabling latch 15 to engage the boom draw when wing sections 37 are in the working position.

Reference has been made earlier to castor mountings for wheels 16 and the need to lock the wheels in a non-castoring mode for transport. This is readily achieved, for example by having a spring loaded pin or similar arrangement acting as a detent to preclude castoring of a wheel when the wing sections are in the transport position. In a specific arrangement, a cam on the spray boom retracts such a spring loaded pin 52, FIG. 1, (which locks the wheel in the non-castoring mode) as the spray boom is rotated from the transport position to the working position. When the spray boom is rotated back to the transport position, the cam releases the spring loaded pin (or other detent) to again lock the wheel in transport position.

The castor mountings thus equipped provide for timely and appropriate pivoting or alignment of the wheels around vertical axes when the sprayer is in working position or mode, and non-castoring operation of the wheels when the sprayer is in transport mode. Optionally, and particularly with longer wing sections and wings with multiple sections, it is desirable to have two or more wheels supporting each wing and appropriately spaced along its length. All such wheels should have castor mountings, but it is not necessary that all of them lock into a non-castoring mode in transport position. It is essential only that there be at least one wheel supporting any one wing in a non-castoring mode in the transport postion; other wheels supporting the same wing can be freely castoring at all times. When two wheels are used under any one wing, it is preferable that the one closer to the center section be equipped to lock in the non-castoring mode for transport. When three or more wheels are used under one wing, it is preferable that the middle one, or one of the middle wheels, be equipped to lock in the noncastoring mode for transport. Wheels which are allowed to castor freely at all times preferably are equipped with brake pads or similar means in conjunction with the pivoting parts, to provide some resistance to castoring, to prevent shimmying of the freely castoring wheels at high speeds during transport.

Referring again to the castoring wheels which are lockable to a non-castoring mode, optionally and preferably these are mounted to castor about a vertical axis but only between two extreme positions or stops which allow slightly less than 180 degrees of pivoting. In one extreme position the wheel is situated to permit forward movement of the wing sections in normal field or working position, i.e. with the plane of the wheel substantially at right angles to the boom of the wing section and with an appropriate allowance being made for a desirable amount of "toe-out" of the wheel, to keep the wheel mount held against the stop at one extreme castor position (the outer) as the wheel and boom travel forward. Optionally the retention of the wheel at this extreme outer position can be assisted by a spring loaded toggle link which can also serve to expedite castoring of the wheel once it has started to turn away from the outer limiting position. The ability of the wheels to castor readily, preferably between pre-set optimum limits, greatly facilitates turning the sprayer when it is extended in the working position.

Figure 7:
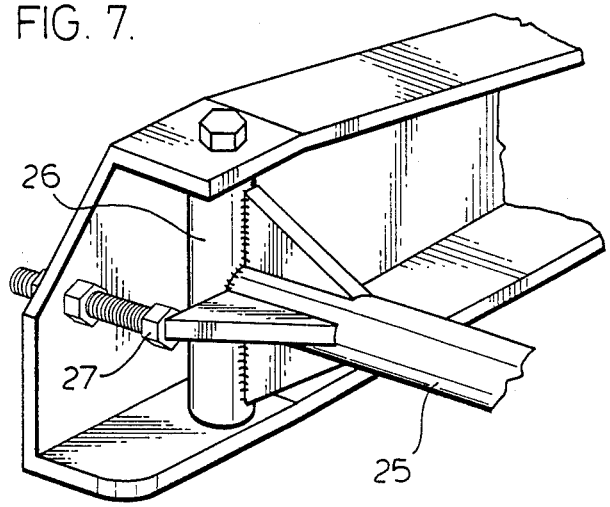
FIG. 7 is an isometric projection of part of a mounting for a lockable castoring wheel.
Figure 8:
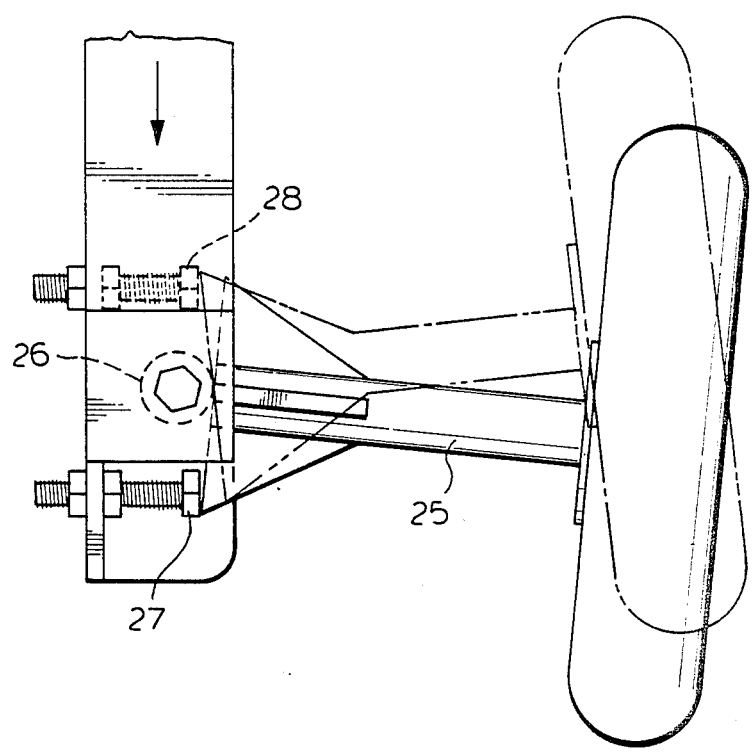
FIG. 8 is a top view of the parts shown in FIG. 7 and also showing the wheel mounted on the axle.

In addition to having castor mounts to permit either limited or complete castoring action of the wing supporting wheels for the working position, it is desirable and preferred that the wheel mountings also provide for some limited or restricted turning of the wheels around vertical axes when they are in the transport position, i.e. when locked in a non-castoring mode. This is readily achieved by simple means, for example as illustrated in FIGS. 7 and 8, by having the wheel axles or spindles 25, which are on horizontal axes, end mounted on vertical spindles 26 so that they can swivel on the vertical axis of these respective spindles; limiting stops 27 and 28 are also provided to permit only limited turning of the wheels when they swivel on these vertical spindles. Such arrangement permits the wing supporting wheels to turn slightly outwards when the sprayer in transport position starts to back up and soil resistance on the wheels forces them to rotate on the vertical spindle, away from the stop limiting such rotation when the sprayer is moving forward and towards the stop limiting the rotation when the sprayer is moving backward. As the motive power source continues to move the wing sections backwards in the transport position, the out turned, non-castoring wheels lead the wing sections to spread and extend out to the working position, with the wings aligned transverse to the direction of travel. When the wings are fully extended, rotation of the spray boom to its working position retracts the spring loaded pin locking the castor mountings and permits castoring of the wing supporting wheels. Such rotation also releases the latches retaining the boom draws in transport position, as previously described.

A major advantage of the invention, as can be seen from the foregoing description, is that the operator need not dismount from the tractor in order to convert the implement from working position into transport position and vice versa.

While the preferred structure has been shown and described above, the invention is not limited to the particular details shown.

What is claimed is:

1. A field sprayer, extendable for broad swath application of liquid in working position and foldable for narrow width transport in a transport position comprising:
   (a) a wheeled motive power source for drawing the sprayer over the ground,
   (b) a main boom having (i) a center section, longitudinally aligned transverse to the line of travel of the sprayer and rigidly attached behind said power source and (ii) at least one wing section at each end of the center section, each wing section being offset from direct alignment with the center section and sections adjacent the center section being hingedly attached thereto by a respective universal hinge having a vertical axis and a horizontal axis, theoretical extensions of said axes intersecting at a point hereinafter designated, said wing sections being adapted for additional wheel support and foldable between a working position, aligned parallel with but offset from the center section, and a transport position at right angles to the center section;
   (c) a spray boom having a center section and aligned wing sections corresponding to each of said main boom sections respectively and rotatably secured thereto in close parallel relation, said spray boom sections being rotatable about the axis of said alignment and flexibly linked by universal joints, the intersection of the axes of rotation of each said joint being the point of intersection of the aforesaid extensions of the respective main boom universal hinge axes, (d) sections of spray tube, each one rotatably attached to a corresponding spray boom section in spaced parallel relation to be rotated by rotation of the spray boom about the rotation axis of the spray boom, said spray tube sections being linked by flexible connections to a supply, on said motive power source, of liquid to be sprayed, (e) a plurality of spray nozzles at spaced points along the length of the spray tubes to eject liquid spray, (f) wheel means supporting each of said wing sections of said main boom substantially parallel to the ground, each said wheel means being adapted to engage the ground and support its respective wing section by a castor mounting in a castoring mode when the main boom wing sections are hinged in said working position and at least one of said castor mountings on each side of the center section being arranged to lock into a non-castoring mode when the main boom wing sections are folded into the transport position, (g) power means on said motive power source to rotate the spray boom center section and its spray tube section between a working position, in which the spray tube is held at an adjustable elevation substantially beside the spay boom, and a transport position, in which the spray tube is held substantially vertically above the spray boom, said center section simultaneously rotating the spray boom wing sections between their working position and transport position, (h) means to lock and release the wheel means into non-castoring and castoring modes respectively, and (i) a rigid boom draw means for each main boom wing section adjacent the center section, each said draw means being pivotally connected at the back end thereof to the respective wing section and having a front end adapted to move between a transport position, in which said front end is carried by the motive power source with no load thereon, and a working position in which the front end is releasably latched into a latch on the motive power source to draw a load.

2. A field sprayer as claimed in claim 1 in which the power means to move the spray boom center section between its working and transport positions is an hydraulic cylinder attached between the motive power source and a lever connected to a pivot link which moves to rotate the spray boom between its working and transport positions.

3. A field sprayer as claimed in claim 2, in which the front end of each boom draw is carried by a respective rigid fold arm that is pivotally mounted on the motive power source to pivot the front end of its draw boom from its transport position, in which said front end is supported solely by the fold arm, and its latched working position, in which said front end is latched onto the motive power source.

4. A field sprayer as claimed in claim 3, wherein the wheel means which lock into a non-castoring mode have mountings that permit limited turning of the respective wheels around vertical axes when they are locked in a non-castoring mode.

5. A field sprayer as claimed in claim 4, wherein said mountings comprise a horizontal wheel axle end mounted on a vertical spindle on which the wheel axle can turn on a vertical axis between limiting stops.

6. In a field sprayer, extendable for broad swath application of liquid in working position and foldable for narrow width transport in a transport position comprising:

(a) a wheeled motive power source for drawing the sprayer over the ground, (b) a main boom having (i) a center section, securely attached behind said power source and longitudinally aligned transverse to the line of travel of the sprayer and (ii) at least one wing section at each end of the center section, hingedly attached thereto, adapted for additional wheel support, and foldable between a working position, aligned parallel with the center section, and a transport position at right angles to the center section;

(c) a spray boom having a center section and wing sections corresponding to each of said main boom sections respectively and rotatably secured thereto in close parallel relation, said spray boom sections being flexibly linked and rotatable about their longitudinal axes between a transport position and a working position, (d) sections of spray tube, each one rotatably attached to a corresponding spray boom section in spaced parallel relation to be rotated by rotation of the spray boom about the rotation axis of the spray boom, said spray tube sections being linked by flexible connections to a supply, on said motive power source, of liquid to be sprayed, (e) a plurality of spray nozzles at spaced points along the length of the spray tubes to eject liquid spray, (f) power means on said motive power source to move the spray boom center section between its working position and its transport position, and (g) a rigid boom draw means for each main boom wing section adjacent the center section, each said draw means being pivotally connected at the back end thereof to the respective wing section and having a front end adapted to move between a transport position, in which said front end is carried by the motive power source with no load thereon, and a working position in which the front end is releasably latched into a latch on the motive power source to draw a load.

(h) the improvement comprising the combination of:

(1) wing sections of the main boom that are offset from direct alignment with the center section thereof and foldable between a working position, parallel to and offset from the center section, and a transport position at right angles to the center section, the hinged attachment of the main boom center section to each respective wing section being a respective universal hinge having a vertical axis and a horizontal axis, theoretical extensions of said axes intersecting at a point hereinafter designated, (2) flexible links between the spray boom center section and respective wing sections that are respective universal joints, the intersection of the axes of rotation of each said joint being the point of intersection of the aforesaid extensions of the respective main boom universal hinge axes, (3) wheel means supporting each of said main boom wing sections substantially parallel to the ground, each said wheel means being adapted to engage the ground and support its respective wing section by a castor mounting in a castoring mode when the main boom wing sections are hinged in said working position and at least one of said castor mountings on each side of the center section being arranged to lock into a non-castoring mode when the main boom wing sections are folded into the transport position, and (4) means to lock and release the wheel means into non-castoring and castoring modes respectively.

7. In a field sprayer as claimed in claim 6, wheel means as aforesaid which lock into a castoring mode and also have mountings that permit limited turning of the respective wheels around vertical axes when they are locked in the non-castoring mode.

8. In a field sprayer as claimed in claim 7, wheel means as aforesaid in which said mountings comprise a horizontal wheel axle mounted on a vertical spindle on which the wheel axle can turn on a vertical axis between limiting stops.

* * * * *